(12) United States Patent
Hymel

(10) Patent No.: US 10,062,212 B2
(45) Date of Patent: *Aug. 28, 2018

(54) METHOD AND DEVICE FOR PROVIDING AUGMENTED REALITY OUTPUT

(71) Applicant: BlackBerry Limited, Waterloo (CA)

(72) Inventor: James Allen Hymel, San Jose, CA (US)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/016,357

(22) Filed: Feb. 5, 2016

(65) Prior Publication Data

US 2016/0155271 A1 Jun. 2, 2016

Related U.S. Application Data

(63) Continuation of application No. 13/406,562, filed on Feb. 28, 2012, now Pat. No. 9,277,367.

(51) Int. Cl.
*G06T 19/00* (2011.01)
*H04W 4/04* (2009.01)

(52) U.S. Cl.
CPC ........... *G06T 19/006* (2013.01); *H04W 4/043* (2013.01)

(58) Field of Classification Search
CPC .......................... G01C 21/3644; G06T 19/006
See application file for complete search history.

(56) References Cited

U.S. PATENT DOCUMENTS

| | | | |
|---|---|---|---|
| 6,317,127 B1* | 11/2001 | Daily ...................... | G06T 15/10 345/629 |
| 7,991,220 B2 | 8/2011 | Nagai et al. | |
| 8,502,835 B1* | 8/2013 | Meehan ................ | G06T 19/006 345/633 |
| 8,519,844 B2* | 8/2013 | Richey .................. | H04W 4/023 340/539.1 |
| 8,542,906 B1* | 9/2013 | Persson .............. | G06K 9/00671 382/103 |
| 8,638,375 B2 | 1/2014 | Amor Morales et al. | |
| 2003/0179308 A1 | 9/2003 | Zamorano et al. | |
| 2005/0159916 A1* | 7/2005 | Anabuki ................. | G06T 15/20 702/151 |

(Continued)

FOREIGN PATENT DOCUMENTS

| | | |
|---|---|---|
| EP | 1814101 | 8/2007 |
| EP | 2397819 | 12/2011 |

OTHER PUBLICATIONS

CIPO, CA Office Action relating to Application No. 2,802,276, dated Feb. 4, 2015.

(Continued)

*Primary Examiner* — Jitesh Patel
(74) *Attorney, Agent, or Firm* — Rowand LLP

(57) ABSTRACT

Methods and devices for generating an augmented reality output are described. In one aspect, the method includes: obtaining camera data from a camera associated with an electronic device, the camera data defining an image representing a card having a graphic disposed thereon; obtaining sensor data from a sensor associated with the electronic device; and generating an augmented reality output on an output interface based on the sensor data and the graphic.

18 Claims, 9 Drawing Sheets

(56) References Cited

U.S. PATENT DOCUMENTS

| | | | |
|---|---|---|---|
| 2005/0195128 A1* | 9/2005 | Sefton | A63B 71/0622 345/7 |
| 2006/0038833 A1* | 2/2006 | Mallinson | A63F 13/02 345/633 |
| 2007/0024527 A1* | 2/2007 | Heikkinen | A63F 13/52 345/9 |
| 2008/0100620 A1* | 5/2008 | Nagai | A63F 3/00643 345/424 |
| 2009/0070093 A1* | 3/2009 | Nakanishi | A63F 13/00 703/22 |
| 2009/0153550 A1* | 6/2009 | Keaney | H04N 5/225 345/419 |
| 2009/0153587 A1* | 6/2009 | Kang | G06T 19/006 345/632 |
| 2009/0209343 A1* | 8/2009 | Foxlin | G07F 17/32 463/36 |
| 2009/0237546 A1 | 9/2009 | Bloebaum et al. | |
| 2009/0285484 A1 | 11/2009 | Mallison et al. | |
| 2009/0286570 A1 | 11/2009 | Pierce | |
| 2009/0289956 A1* | 11/2009 | Douris | G01C 21/3602 345/633 |
| 2010/0022354 A1* | 1/2010 | Fisher | A63B 22/0605 482/8 |
| 2010/0048290 A1 | 2/2010 | Baseley et al. | |
| 2011/0055049 A1 | 3/2011 | Harper et al. | |
| 2011/0102605 A1* | 5/2011 | Hannaford | G06F 17/3087 348/207.1 |
| 2011/0115816 A1* | 5/2011 | Brackney | G06Q 10/06 345/629 |
| 2011/0145068 A1 | 6/2011 | King et al. | |
| 2011/0161875 A1 | 6/2011 | Kankainen | |
| 2011/0164163 A1 | 7/2011 | Bilbrey et al. | |
| 2011/0165893 A1* | 7/2011 | Hyung | G01S 5/0252 455/457 |
| 2011/0020136 A1 | 8/2011 | Bregman-Amitai et al. | |
| 2011/0201362 A1 | 8/2011 | Bregman-Amitai | |
| 2011/0227915 A1* | 9/2011 | Mandella | G01B 21/04 345/419 |
| 2011/0242134 A1* | 10/2011 | Miller | G06T 19/006 345/633 |
| 2011/0279478 A1* | 11/2011 | Bitra | G06F 17/30241 345/633 |
| 2011/0310260 A1 | 12/2011 | Jordan et al. | |
| 2012/0025976 A1* | 2/2012 | Richey | H04W 4/023 340/539.13 |
| 2012/0032977 A1 | 2/2012 | Kim et al. | |
| 2012/0105475 A1 | 5/2012 | Tseng | |
| 2012/0105476 A1* | 5/2012 | Tseng | G01C 21/3611 345/633 |
| 2012/0242510 A1* | 9/2012 | Choi | G01C 21/3688 340/988 |
| 2012/0293506 A1 | 11/2012 | Vertucci | |
| 2013/0035581 A1* | 2/2013 | Vesto | G06F 19/322 600/407 |
| 2013/0038633 A1* | 2/2013 | Maggiore | B01D 65/104 345/633 |
| 2013/0049976 A1* | 2/2013 | Maggiore | G06T 19/006 340/686.1 |
| 2013/0155106 A1* | 6/2013 | Rolleston | G06T 19/006 345/633 |
| 2013/0187952 A1 | 7/2013 | Berkovich et al. | |

OTHER PUBLICATIONS

IGN Entertainment, "Giant 3DS AR Cards Coming to Club Nintendo", Mar. 10, 2011, http://ds.ign.com/articles/115/1154818p1.html.

IGN Entertainment, "Nintendo 3DS AR Games: The Basics", Mar. 17, 2011, http://ds.ign.com/articles/115/1155725p1.html.

TechSplurge, 33 Awesome Augmented Reality Apps & Games for Android, Mar. 17, 2011, http://techsplurge.com/3214/mega-list-33-awesome-augmented-reality-apps-games-android/.

Nicholson, Brad; TouchArcade, "BANDAI Shows Off Its Own AR Card Game", Jun. 17, 2011, http://toucharcade.com/2011/06/17/bandai-shows-off-its-own-ar-card-game/.

Aronson, Phil; Video Game Writers, "Is Augmented Reality The Future of 3DS Gaming?", May 24, 2011, http://videogamewriters.com/is-augmented-reality-the-future-of-3ds-gaming-11331/.

GameFAQs, "Review by horror_spooky, Welcome to a whole new dimension of gaming!" Originally Posted: Apr. 4, 2011, http://www.gamefaqs.com/3ds/619882-ar-games/reviews/review-146075.

Chow Chiu Hung, Lam Hei Tat; Augmented Reality Table for Interactive Card Games, Department of Computer Science and Engineering The Chinese University of Hong Kong 2004/2005 Final Year Project First Term Report, Dec. 2, 2004.

EPO, Extended European Search Report relating to application No. 12157234.1 dated Jul. 5, 2012.

* cited by examiner

METHOD AND DEVICE FOR PROVIDING AUGMENTED REALITY OUTPUT

TECHNICAL FIELD

The present disclosure relates to augmented reality systems and, more particularly, to methods and electronic devices for providing an augmented reality output based on a real-world card.

BACKGROUND

Electronic devices, such as smartphones and tablet computers, are sometimes equipped with cameras. Cameras may, for example, be used to allow a user to capture a video or a still photograph. Some electronic devices may store images which are captured with a camera to a memory of the electronic device. Some electronic devices may transmit data via a communication subsystem to another electronic device in order to provide a video based chat.

Electronic devices may use camera data to provide an augmented reality. Augmented reality is a process wherein a live view of a physical, real world environment (which may be obtained via the camera) may be augmented by computer generated input.

The functions and features provided by augmented reality systems are often quite limited.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a method, implemented by a processor of an electronic device. The method includes: obtaining camera data from a camera associated with the electronic device, the camera data defining an image representing a card having a graphic disposed thereon; obtaining sensor data from a sensor associated with the electronic device; and generating an augmented reality output on an output interface in dependence on the sensor data and the graphic.

In another aspect, the present disclosure describes an electronic device. The electronic device includes a camera and an output interface. The electronic device also includes a sensor and a processor connected to the camera, the sensor, and the output interface. The processor is configured to: obtain camera data from the camera, the camera data defining an image representing a card having a graphic disposed thereon; obtain sensor data from the sensor; and generate an augmented reality output on the output interface in dependence on the sensor data and the graphic.

In yet another aspect, the present disclosure describes a computer readable storage medium comprising computer readable instructions for: obtaining camera data from a camera associated with an electronic device, the camera data defining an image representing a card having a graphic disposed thereon; obtaining sensor data from a sensor associated with the electronic device; and generating an augmented reality output on an output interface in dependence on the sensor data and the graphic.

Other example embodiments of the present disclosure will be apparent to those of ordinary skill in the art from a review of the following detailed descriptions in conjunction with the drawings.

Example Card

Figure 2:
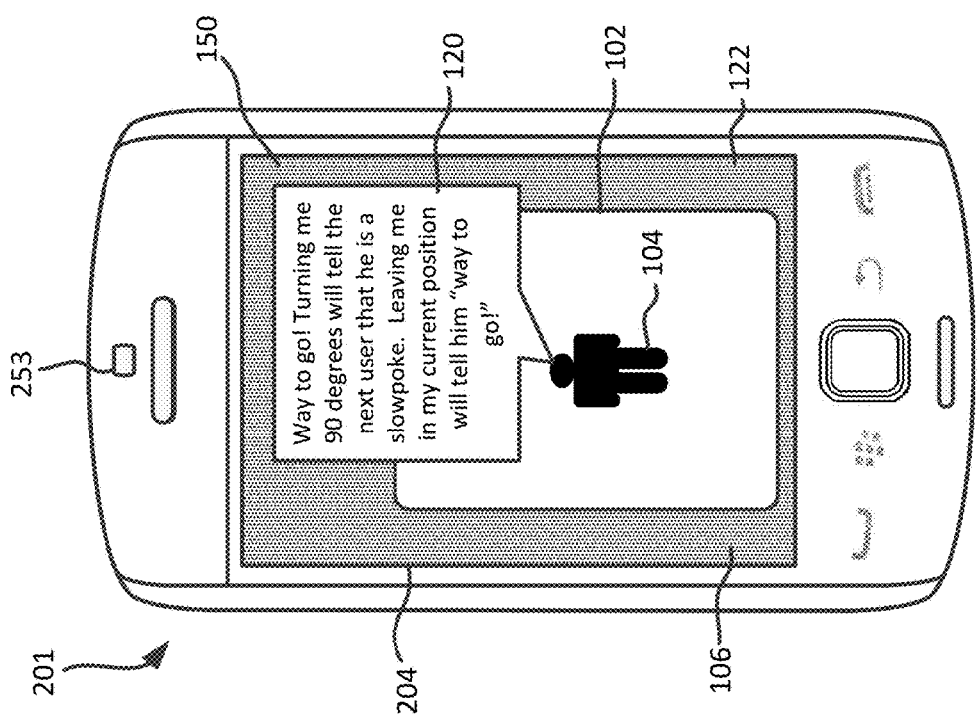
FIG. 2 is a top view of an example electronic device in accordance with example embodiments of the present disclosure.
Figure 1:
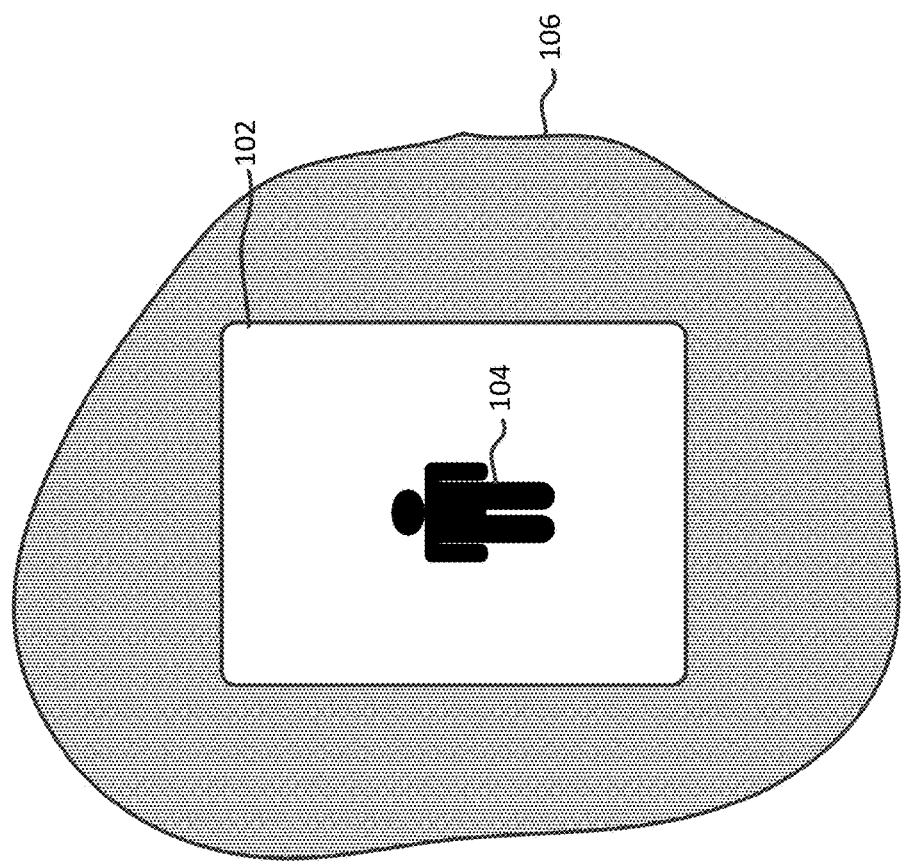
FIG. 1 is a top view of an example card for use with an electronic device in accordance with example embodiments of the present disclosure.
Figure 3:
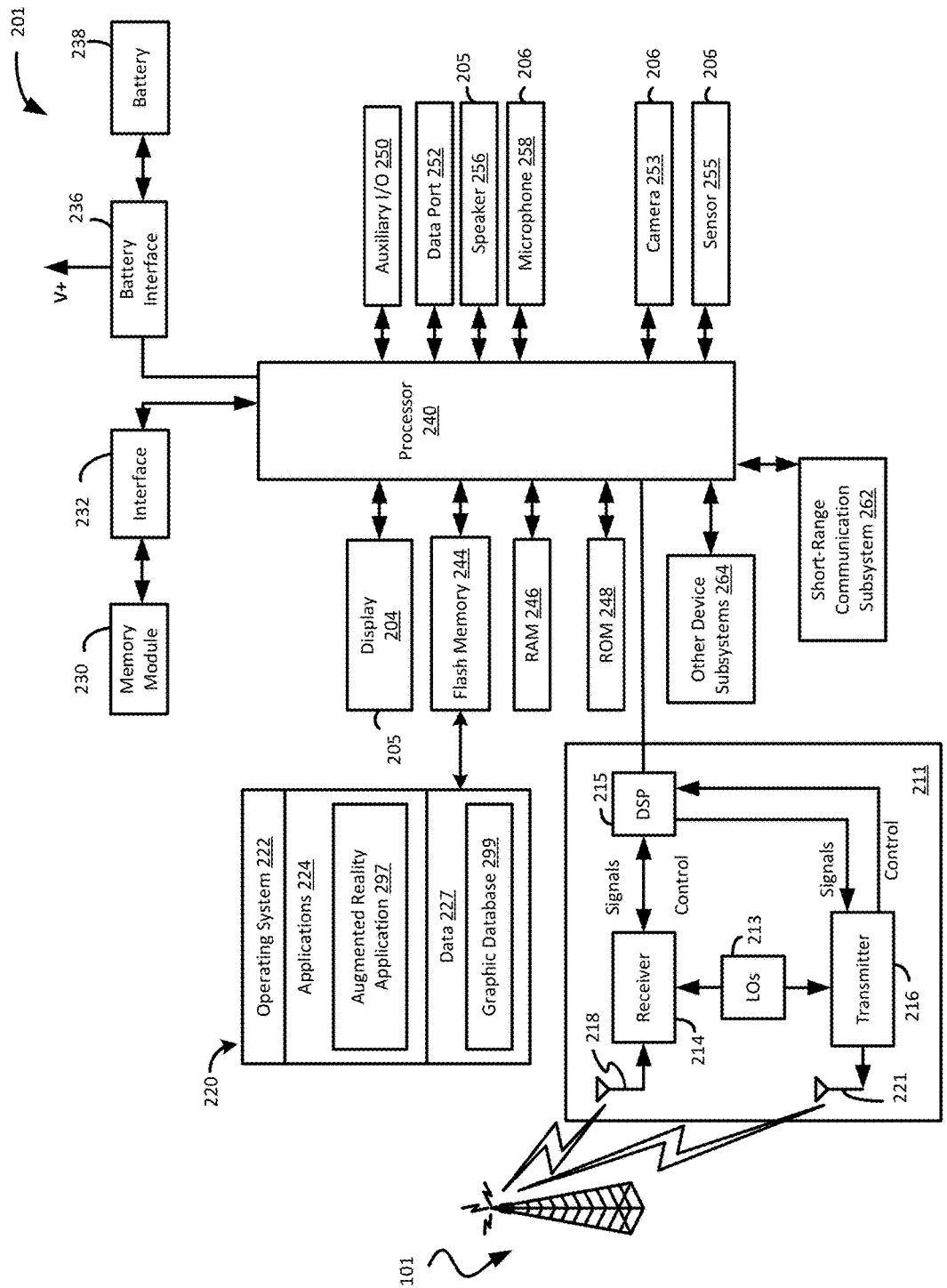
FIG. 3 is a block diagram illustrating components of an example electronic device in accordance with example embodiments of the present disclosure.

Referring first to FIG. 1, a top view of an example card 102 is illustrated. The card 102 may be associated with an augmented reality application 297 (FIG. 3). The card 102 may, in at least some embodiments, be used to provide an augmented reality experience on an electronic device 201 (FIGS. 2 and 3). The card 102 may, for example, be constructed of heavy paper, thin cardboard, plastic-coated paper, plastic, cotton-blend paper, or another material. In at least some embodiments, the card 102 is a playing card. That is, the card 102 may be of the type which is commonly used in card games.

The card 102 may, in at least some embodiments, be palm-sized. In FIG. 1, the card 102 has been placed on a surface 106.

The card 102 includes a graphic 104. The graphic 104 is a visual presentation on the card 102. The graphic 104 may, for example, include photographic features, text features, line features, shape-based features, symbols, graphs, geometric designs, or other features not specifically listed herein. The graphic 104 may, in some embodiments, be a black and white graphic. However, in other embodiments, the graphic 104 may be a color graphic which includes one or more color features. In the embodiment illustrated, the graphic 104 is a depiction of a person. However, in other embodiments, the graphic could take another form.

Example Electronic Device

Referring now to FIG. 2, a top view of an example electronic device 201 is illustrated. In the example illustrated, the electronic device 201 is a smartphone. A smartphone is a mobile phone which offers more advance computing capability than a basic non-smart cellular phone. For example, a smartphone may have the ability to run third party applications which are stored on the smartphone.

In other example embodiments, the electronic device 201 may be of another type. For example, in some embodiments, the electronic device 201 may be a tablet computer. A tablet computer (which may also be referred to as a tablet) is an electronic device which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

The electronic device 201 may, in other embodiments, be of another type. For example, in some embodiments, the electronic device may be a remote control, such as a television remote control, a navigation system, such as a Global Positioning System, a wearable computer, such as a watch, a personal digital assistant (PDA), a desktop, netbook, notebook or laptop style computer system, or a television. The electronic device 201 may, in other embodiments, be of a type not specifically listed herein.

The electronic device 201 includes one or more output interfaces. For example, in the embodiment illustrated in FIG. 2, the electronic device 201 includes a display 204. The display 204 may, for example, be a liquid crystal display (LCD). In at least some embodiments, the display 204 is a touchscreen display which may be used to provide input to the electronic device 201. The touchscreen display may, for example, be a capacitive touchscreen display which senses changes in capacitance.

The electronic device 201 includes one or more cameras 253. The camera 253 is configured to generate camera data, such as images in the form of still photographs and/or motion video. The camera data may be captured in the form of an electronic signal which is produced by an image sensor associated with the camera 253. More particularly, the image sensor (not shown) is configured to produce an electronic signal in dependence on received light. That is, the image sensor converts an optical image into an electronic signal, which may be output from the image sensor by way of one or more electrical connectors associated with the image sensor. The electronic signal represents electronic image data (which may also be referred to as camera data).

In some embodiments, the electronic device 201 may include a front facing camera. A front facing camera is illustrated in FIG. 2. A front facing camera is a camera 253 which is generally located on a front face of the electronic device 201. The front face is typically the face on which a display 204 is mounted. That is, the display 204 is configured to display content which may be viewed from a side of the electronic device 201 where the front facing camera is directed. The front facing camera may be located anywhere on the front surface of the electronic device; for example, the front facing camera may be located above or below the display 204. In at least some example embodiments, the front facing camera may be provided in a central location relative to the display 204 to facilitate image acquisition of a face. In at least some embodiments, the front facing camera may be used, for example, to allow a user of the electronic device 201 to engage in a video based chat with a user of another electronic device 201. An example camera 253 which is a front facing camera is illustrated in FIG. 2.

The electronic device 201 may, in at least some embodiments, include a rear facing camera. A rear facing camera is a camera 253 which is located to obtain images of a subject near a rear face of the electronic device 201. The rear face is typically a face which does not include the main display 204 of the electronic device 201. The rear face is, in at least some embodiments, located at a side of the electronic device 201 which is opposite the side which includes the display 204. The rear facing camera may obtain images which are not within the field of view of the front facing camera. The field of view of the front facing and rear facing cameras may generally be in opposing directions. Since FIG. 2 illustrates a top view of the electronic device 201, the rear facing camera is not illustrated.

In at least some embodiments, a user may manipulate the electronic device 201 so that a camera 253 on the electronic device 201 is directed at a card 102 associated with an augmented reality application 297 (FIG. 3) of the electronic device 201. For example, the electronic device 201 may be oriented so that a camera 253 of the electronic device 201 faces the card 102 and is able to capture an image which includes the card 102. In at least some embodiments, the rear facing camera (not shown) of the electronic device 201 may be directed at the card 102. That is, a user may move the electronic device 201 so that the electronic device 201 is in a position in which the card 102 is within a field of view of a rear facing camera.

As will be described in greater detail below, an augmented reality application 297 (FIG. 3) associated with the electronic device 201 may be configured such that an augmented reality output 150 of the card 102 (FIG. 1) is displayed on the display 204 when the electronic device 201 is in a position in which a camera 253 is directed at the card 102.

The augmented reality output 150 includes a device-generated portion 120 which is generated by the electronic device 201. In the example embodiment illustrated, the device-generated portion is a comment box, which includes text. In at least some embodiments, the device-generated portion 120 may be a graphic and/or an animation. In at least some embodiments, the device-generated portion 120 may animate or alter the graphic 104 on the card 102. For example, in the embodiment of FIG. 1, where the graphic is a person, the person could be animated. For example, the person could appear to walk, run jump, or move in another manner.

The augmented reality output 150 also includes a real-world portion 122. The real-world portion 122 is a portion of the output which is defined by camera data obtained by a camera 253 (such as the rear facing camera). The real-world portion 122 may reflect real world changes in the camera data. That is, changes in the camera data may result in corresponding changes to the rear world portion. Such changes may be reflected in real-time or in near-real-time. By way of example, if an object, such as a user's finger is moved into the field of view of the camera 253, then the real-world portion 122 may be immediately updated to reflect the change. Thus, the real-world portion acts as a viewfinder and displays images defined by camera data in real-time or near-real-time.

The device-generated portion 120 may be superimposed on an image defined by the camera data obtained by the camera 253. The portion of the image which is not covered by the superimposing forms the real-world portion 122 of the augmented reality output 150.

In the embodiment illustrated in FIG. 2, the real-world portion 122 includes the card 102 (or a portion thereof). In the illustrated embodiment, the real-world portion 122 also includes the graphic 104 on the card 102 and a portion of the surface 106 on which the card is supported.

As will be described in greater detail below, the electronic device 201 may be configured to generate the augmented reality output 150 based on the camera data and also based on sensor data obtained from a sensor 255 (FIG. 3) associated with the electronic device 201.

Referring now to FIG. 3, a block diagram of an example electronic device 201 is illustrated. In the illustrated example embodiment, the electronic device 201 is a mobile communication device such as the smartphone of FIG. 2. In at least some example embodiments, the mobile communication device is a two-way communication device having data and possibly voice communication capabilities, and the capability to communicate with other computer systems; for example, via the internet. As noted above, the electronic device 201 may take other forms in other embodiments.

The electronic device 201 of FIG. 3 includes a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras 253, one or more sensors 255, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces), a short-range communication subsystem 262, and other device subsystems generally designated as 264. Some of the subsystems shown in FIG. 3 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

The electronic device 201 includes one or more sensors 255. The sensors are configured to generate sensor data. In at least some embodiments, one or more of the sensors 255 may specify a physical property associated with the electronic device 201 or its operating environment. The physical property is a property that is measurable and whose values depend on a physical system's state. By way of example, the physical property may include a location, pressure, velocity, orientation, direction, temperature, etc.

The one or more sensors 255 may, in at least some embodiments, include a location sensor. The location sensor is a geospatial location sensor which is configured to produce sensor data based on the location of the electronic device 201. That is, the location sensor may provide sensor data which specifies a location of the electronic device 201. In at least some embodiments, the location sensor is a global positioning system (GPS) sensor. However, in other embodiments, the location sensor may be of another type. For example, in some embodiments, the location sensor may be configured to determine a location of the electronic device 201 based on cellular and/or Wi-Fi triangulation. The location sensor may be of a type not specifically listed herein.

In at least some embodiments, the one or more sensors 255 of the electronic device 201 include an electronic compass which generates sensor data which specifies direction information. The direction information may, for example, specify the direction of magnetic north. In at least some embodiments, the electronic compass is a magnetometer. A magnetometer is an instrument which is used to measure the strength or direction of a magnetic field.

In at least some embodiments, the one or more sensors 255 of the electronic device 201 include an altimeter. The altimeter generates sensor data which specifies an altitude associated with the electronic device. The altimeter may, for example, be provided by the location sensor. For example, the altimeter may determine altitude by four-way trilateration. For example, where the location sensor is a GPS sensor, altitude of the electronic device 201 may be determined by trilateration with four or more satellites.

In at least some embodiments, the one or more sensors 255 may include a thermometer. The thermometer is configured to generate sensor data which specifies a temperature associated with the electronic device. In at least some embodiments, the thermometer is configured to generate sensor data which corresponds to the temperature of an operating environment in which the electronic device 201 is located. For example, the thermometer may generate sensor data based on the air temperature near the electronic device 201.

In at least some embodiments, the one or more sensors 255 of the electronic device 201 may include an orientation sensor. The orientation sensor is a sensor which is configured to generate sensor data based on the orientation of the electronic device 201. For example, the orientation sensor may generate sensor data based on the device's orientation relative to the earth's gravitational field. In at least some embodiments, the orientation sensor is an accelerometer. In at least some embodiments, the orientation sensor is a gyroscope. The orientation sensor may take other forms in other embodiments.

The sensor data generated by the sensor 255 is an electrical signal and is, in at least some embodiments, a digital signal. The sensor data may be provided to a processor 240 associated with the electronic device 201 for processing and/or analysis. The sensor(s) 255 may be communicably coupled to the processor 240.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short-range communication subsystem 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 3, the software modules 220 may include operating system software 222 and one or more additional applications 224 or modules such as, for example, an augmented reality application 297. In the example embodiment of FIG. 3, the augmented reality application 297 is illustrated as being implemented as a stand-alone application 224, but in other example embodiments, the augmented reality application 297 could be provided by another application or module such as, for example, the operating system software 222. Furthermore, while the augmented reality application 297 is illustrated with a single block, the functions or features provided by the augmented reality application 297 could, in at least some embodiments, be divided up and implemented by a plurality of applications and/or modules.

The augmented reality application 297 is configured to generate an augmented reality output 150 (FIG. 2) on an output interface 205 associated with the electronic device 201. In at least some embodiments, the augmented reality application 297 is configured to generate an augmented reality output 150 on the display 204 associated with the electronic device 201. More particularly, the augmented reality application 297 is configured to obtain camera data from the camera 253 and sensor data from the sensor 255. The camera data may, in at least some embodiments, define an image representing a card 102 (FIG. 1) having a graphic 104 (FIG. 2) disposed thereon. In at least some embodiments, the augmented reality application 297 may generate an augmented reality output 150 in dependence on the sensor data and the card 102. For example, the augmented reality application 297 may generate an augmented reality output 150 based on both the sensor data from a sensor 255 and the graphic which is on a card 104 captured in the camera data. The augmented reality output 150 may be of the type described above with reference to FIG. 2.

Accordingly, the camera data may define a card 102 associated with the augmented reality application 297. In at least some embodiments, a card associated with the augmented reality application 297 is a card 102 which has a graphic 104 which the augmented reality application is able to identify. In at least some embodiments, the augmented reality application 297 may only provide the augmented reality output 150 if the augmented reality application 297 identifies the card. More particularly, in at least some embodiments, the augmented reality application 297 may only provide the augmented reality output 150 if it determines that the graphic on the card represented in the image defined by the camera data is a known graphic.

In at least some embodiments, the memory of the electronic device 201 may include a graphic database 299 which may be used to allow the electronic device 201 to determine whether the graphic is a known graphic. The graphic database 299 may define graphics associated with the augmented reality application 297. That is, the graphic database 299 includes information which the augmented reality application 297 may use to identify whether a graphic included in the camera data is a known graphic.

In at least some embodiments, the graphic database 299 may specify information which may be used to generate a device-generated portion 120 (FIG. 2) of the augmented reality output 150 (FIG. 2) when the augmented reality application 297 identifies a graphic. That is, the graphic database 299 may associate a graphic 104 (FIGS. 1 and 2) with specific information which may be used to generate device-generated portions 120. Accordingly, the device-generated portion which is generated may depend, at least in part, on the graphic which is identified. Different graphics may yield different device-generated portions 120 for the augmented reality output 150.

Similarly, the device-generated portion which is generated may depend, at least in part, on the sensor data. Different sensor data may yield different device-generated portions 120 for the augmented reality output 150. In at least some embodiments, the graphic database 299 may associate a single graphic 104 with information which may be used to generate two or more device-generated portions 120. Each of the two or more device-generated portions 120 for a graphic may be associated with different sensor conditions. For example, the sensor conditions may define thresholds for sensor data which are associated with a device-generated portion 120. In at least some such embodiments, when a graphic is identified, one of the device-generated portions 120 for that graphic may be selected based on the sensor data. For example, when a graphic is identified, one of the device-generated portions 120 for that graphic is selected by comparing the sensor data with the sensor conditions for the device-generated portions 120 for that graphic.

Functions and features of the augmented reality application 297 will be described in greater detail below with reference to FIGS. 4 to 11.

The electronic device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Method for Providing Augmented Reality Output

Figure 4:
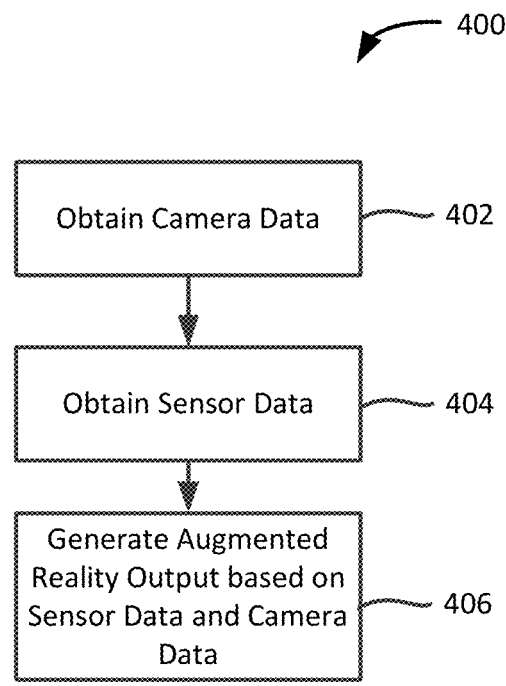
FIG. 4 is a flowchart of an example method for providing an augmented reality output in accordance with example embodiments of the present disclosure.

Referring now to FIG. 4, an example method 400 for providing an augmented reality output is illustrated in flowchart form. The method 400 includes features which may be provided by an electronic device 201, such as the electronic device 201 of FIGS. 2 and/or 3. More particularly, one or more application or module associated with the electronic device 201, such as the augmented reality application 297 (FIG. 3), may contain processor readable instructions for causing a processor associated with the electronic device 201 to perform one or more steps of the method 400 of FIG. 4. That is, in at least some example embodiments, the electronic device 201 may be configured to perform the method 400 of FIG. 4. For example, the method 400 may be implemented by a processor 240 (FIG. 3) of an electronic device 201 (FIG. 3).

In at least some embodiments, one or more of the functions or features of the method 400 of FIG. 4 may be performed, in whole or in part, by another system, software application, module, component or device apart from those specifically listed above.

In at least some embodiments, the method 400 may be initiated when the augmented reality application 297 (FIG. 3) is launched. For example, a user may input a command to the electronic device 201 which causes the augmented reality application 297 to be run on the electronic device 201 and which, consequently, initiates the method 400.

At 402, the electronic device 201 obtains camera data from a camera 253 associated with the electronic device 201. In at least some embodiments, the electronic device 201 obtains camera data from a rear facing camera. However, in other embodiments, the electronic device 201 may obtain camera data from a front facing camera.

The camera data may, in at least some embodiments, define an image representing a card 102 (FIG. 1) having a graphic 104 (FIG. 1) disposed thereon. This may occur when the camera 253 (FIGS. 2 and 3) is directed at the card 102 (FIG. 1) having the graphic 104 (FIG. 1). The card 102 may be a card which is associated with the augmented reality application 297. That is, the card 102 may be a card which has a known graphic (i.e. a graphic which the electronic device 201 is able to identify as being associated with the augmented reality application 297).

At 404, the electronic device 201 obtains sensor data from a sensor 255 associated with the electronic device 201. The sensor 255 may be of a type described above with reference to FIG. 3. For example, the sensor 255 may be any one or more of: a location sensor such as a GPS sensor, an electronic compass, an altimeter, a thermometer, an orientation sensor such as an accelerometer or gyroscope, or a sensor of another type not specifically listed herein. In at least some embodiments, the sensor 255 may generate sensor data which specifies a physical property associated with the electronic device 201 or its operating environment. For example, the sensor data may specify a location, pressure, velocity, orientation, direction, temperature, acceleration and/or altitude associated with the electronic device 201.

At 406, the electronic device 201 may generate an augmented reality output 150 (FIG. 2) on an output interface, such as a display 204 (FIG. 2), based on the sensor data obtained from the sensor 255 at 404 and also based on the graphic 104 included in the camera data at 402.

The augmented reality output 150 (FIG. 2) may include a device-generated portion 120 (FIG. 2) which may be superimposed on the image defined by the camera data obtained at 402. The augmented reality output 150 (FIG. 2) may also include a real-world portion 122, which is a portion of the augmented reality output which is defined by camera data obtained from the camera. That is, the real-world portion 122 may represent the portion of the image obtained by the camera which is not covered when the device-generated portion 120 (FIG. 2) is superimposed on the image defined by the camera data. In at least some embodiments, the device-generated portion 120 is generated based on the graphic 104 included in the camera data and also based on the sensor data.

The augmented reality output 150 may, in at least some embodiments, include an animation. That is, based on the particular graphic which was included in the camera data and based also on the sensor data, the electronic device 201 may generate an animation. The animation which is generated may depend on both the graphic and also on the sensor data. That is, a different graphic may produce a different animation and different sensor data may also produce a different animation. The animation may, in at least some embodiments, form the device-generated portion 120 (FIG. 2) of the augmented reality output 150. That is, the animation may be superimposed on the image defined by the camera data to produce the augmented reality output 150 (FIG. 2).

In at least some embodiments, the augmented reality output 150 may include text. For example, in the embodiment illustrated in FIG. 2 and discussed above, the augmented reality output 150 includes a comment box, which includes text. The text may, in at least some embodiments, provide an instruction to a user of the electronic device 201.

For example, in at least some embodiments, the text may provide an instruction to a user to manipulate the card 102. The instruction may specify a message which will be provided to a next user as a result of the manipulation of the card. For example, in the embodiment of FIG. 2, the text which is included in the augmented reality output 150 states: "Way to go! Turning me 90 degrees will tell the next user that he is a slowpoke. Leaving me in my current position will tell him "way to go!" Accordingly, the instruction may permit the user to communicate with a next user (i.e. to communicate with the next electronic device 201 which captures an image of the card 102 after it is manipulated). The instruction may provide the user with instructions regarding how the card 102 may be manipulated (e.g. "Turning me 90 degrees") and may, in some embodiments, provide the user with information about how the manipulation of the card may be used to communicate with the next user (e.g. "will tell the next user that he is a slowpoke"). The instruction may, for example, specify that the user may manipulate the card in any one or more of the following manners: rotating the card, moving the card (which may, for example, include moving the card horizontally to cause a change in location, or moving the card vertically to cause a change in altitude), and/or flipping the card over. The manipulation may be a manipulation which affects camera data and/or sensor data. That is, camera data and or sensor data for an electronic device having a camera directed at the card would change following the manipulation.

In at least some embodiments, the instruction to manipulate the card may provide a plurality of options for manipulating the card. In at least some embodiments, each option may be associated with a different message for a next user. For example, in the embodiment of FIG. 2, a first option (e.g. "Turning me 90 degrees") may be associated with a first message (e.g. "will tell the next user that he is a slowpoke") and a second option (e.g. "Leaving me in my current position") is associated with a second message (e.g. "will tell him 'way to go!'") which is different from the first message.

The text which is included in the augmented reality output 150 may depend on both the graphic and also on the sensor data. That is, a different graphic may produce different text and different sensor data may also produce different text. The text may, in at least some embodiments, form the device-generated portion 120 (FIG. 2) of the augmented reality output 150. That is, the text may be superimposed on the image defined by the camera data to produce the augmented reality output 150 (FIG. 2).

In at least some embodiments, the augmented reality output 150 may cause one or more features of the card 102 to appear to be modified. For example, in at least some embodiments, the graphic 104 associated with the card may be modified. The manner in which the graphic 104 is modified may depend on the graphic itself and also on the sensor data. For example, where the sensor data indicates that the altitude is greater than a predetermined threshold, then a high-altitude effect may be applied to the graphic. For example, the graphic may appear to be on a mountain or in an airplane. By way of example, the person graphic 104 of FIG. 2 may be shown to climb a mountain or board an airplane. By way of further example, if the sensor data suggests that the temperature is greater than a predetermined threshold, then a high-temperature effect may be applied to the graphic. By way of example, a sun or palm trees may be added to the graphic when it is output on the display 204.

In at least some embodiments, the output interface through which the augmented reality output is generated at 406 is a display 204. That is, at 204, the augmented reality output 150 is displayed on the display 204 associated with the electronic device 201.

As noted above in the discussion of FIG. 3, in at least some embodiments, the electronic device 201 may include a graphic database 299 which defines known graphics (e.g. graphics associated with an augmented reality application 297). The graphics database 299 may specify information which may be used to generate a device-generated portion 120 (FIG. 2) of the augmented reality output 150 (FIG. 2) when the augmented reality application 297 identifies a graphic. That is, the graphic database 299 may associate a graphic 104 (FIGS. 1 and 2) with specific information which may be used to generate device-generated portions 120.

The device-generated portion 120 which is generated may depend, at least in part, on the sensor data. Different sensor data may yield different device-generated portions 120 for the augmented reality output 150. In at least some embodiments, the graphic database 299 may associate a single graphic 104 with information which may be used to generate two or more device-generated portions 120. Each of the two or more device-generated portions 120 for a graphic may be associated with different sensor conditions. For example, the sensor conditions may define thresholds for sensor data which are associated with a device-generated portion 120.

In at least some such embodiments, when a graphic is identified by the electronic device 201, one of the device-generated portions 120 for that graphic may be selected based on the sensor data. For example, when a graphic is identified, one of the device-generated portions 120 for that graphic is selected by comparing the sensor data with the sensor conditions for the device-generated portions for that graphic. Accordingly, in at least some embodiments, at 406, when generating the augmented reality output based on the camera data and the sensor data, the electronic device 201 may consult the graphic database 299. For example, the electronic device 201 may use the graphic database 299 to select an appropriate device-generated portion based on the graphic and the sensor data.

Method for Providing Augmented Reality Output

In at least some embodiments, the augmented reality output 150 will only be generated based on the graphic and the sensor data if the electronic device 201 determines that the graphic is known to the electronic device 201.

Figure 5:
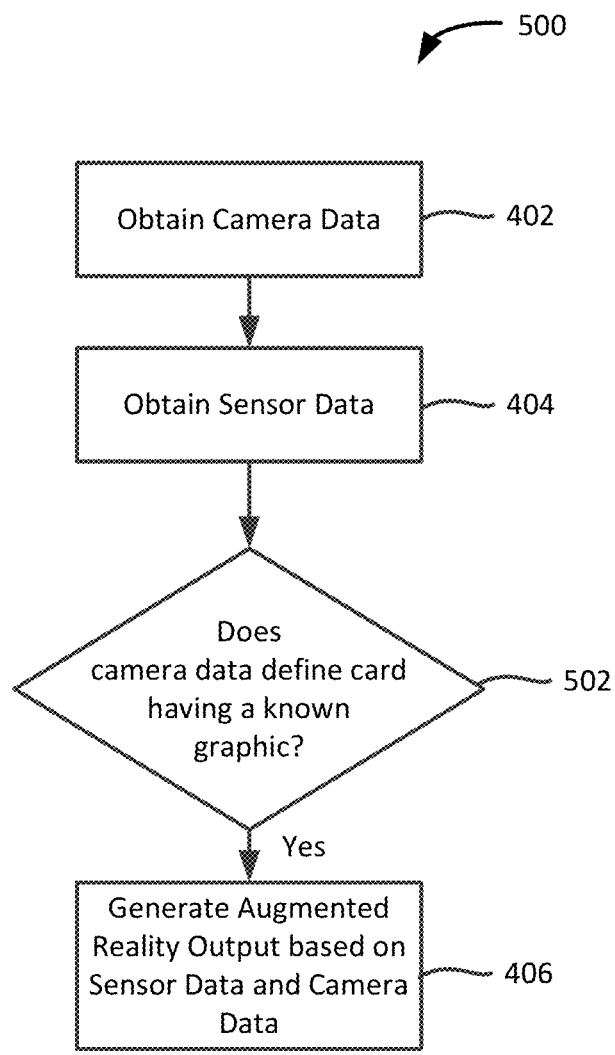
FIG. 5 is a flowchart of an example method for providing an augmented reality output in accordance with example embodiments of the present disclosure.

Referring now to FIG. 5, one such example method 500 is illustrated. In FIG. 5, an example method 500 for providing an augmented reality output is illustrated in flowchart form. The method 500 includes features which may be provided by an electronic device 201, such as the electronic device 201 of FIGS. 2 and/or 3. More particularly, one or more application or module associated with the electronic device 201, such as the augmented reality application 297 (FIG. 3), may contain processor readable instructions for causing a processor associated with the electronic device 201 to perform one or more steps of the method 500 of FIG. 5. That is, in at least some example embodiments, the electronic device 201 may be configured to perform the method 500 of FIG. 5. For example, the method 500 may be implemented by a processor 240 (FIG. 3) of an electronic device 201 (FIG. 3).

In at least some embodiments, one or more of the functions or features of the method 500 of FIG. 5 may be performed, in whole or in part, by another system, software application, module, component or device apart from those specifically listed above.

In at least some embodiments, the method 500 may be initiated when the augmented reality application 297 (FIG. 3) is launched. For example, a user may input a command to the electronic device 201 which causes the augmented reality application 297 to be run on the electronic device 201 and which, consequently, initiates the method 500.

The method 500 includes a number of features which are described in greater detail above with reference to the method 400 of FIG. 4. For example, at 402, the electronic device 201 obtains camera data in the manner described above with reference to FIG. 4 and, at 404, the electronic device 201 obtains sensor data in the manner described above with reference to FIG. 4.

At 502, the electronic device 201 determines whether the camera data defines a card 102 having a known graphic thereon. That is, the electronic device 201 determines whether the camera data defines an image which represents a card having a known graphic disposed thereon. In at least some embodiments, a graphic may be a known graphic if the graphic is associated with an augmented reality application 297 of the electronic device 201. For example, in at least some embodiments, the graphic will be considered a known graphic if it is included in a graphic database 299 associated with the electronic device 201. Accordingly, in at least some embodiments, at 502 the electronic device 201 may consult the graphic database and may determine whether the camera data includes a known graphic.

If the camera data does not include a known graphic then, in some embodiments, no further action will be performed. In some embodiments, if the camera data does not include a known graphic then no augmented reality output 150 will be provided. For example, in some embodiments, if the camera data does not define an image containing a known graphic, then the display 204 may act as a view finder by displaying camera data.

If, however, the electronic device 201 determines that the camera data defines a card having a known graphic then, at 406, an augmented reality output may be generated based on the sensor data and the camera data. 406 is discussed in greater detail above with reference to FIG. 4.

Method for Generating an Output Based on Sensor Data and Camera Data

As noted previously, an augmented reality output 150 (FIG. 2) may depend on both the camera data and also on sensor data. That is, a different graphic may result in a different augmented reality output 150. Similarly, different sensor data may result in different augmented reality output.

Figure 6:
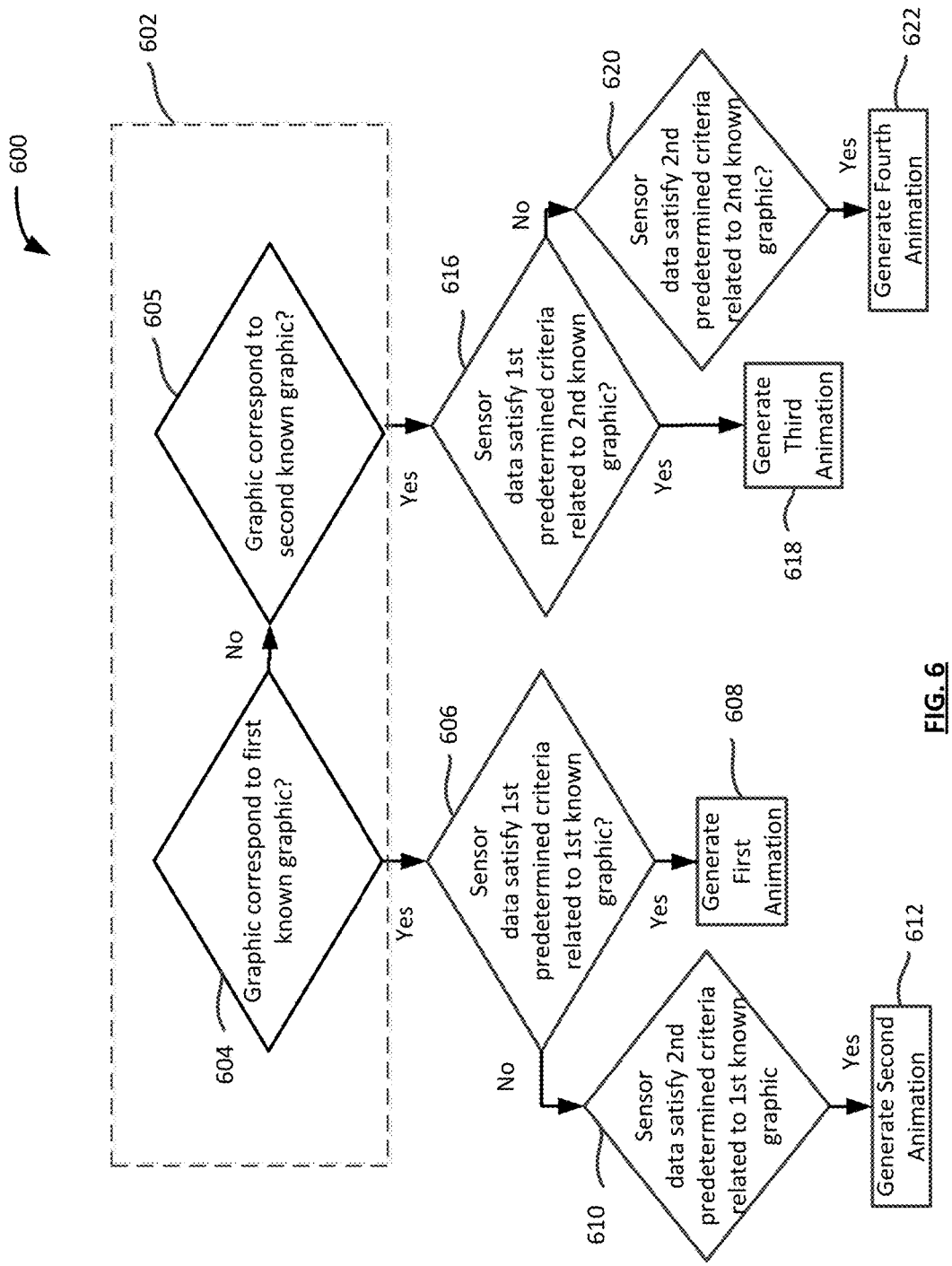
FIG. 6 is a flowchart of an example method for generating an output based on sensor data and camera data in accordance with example embodiments of the present disclosure.

Reference will now be made to FIG. 6 which illustrates a method 600 for generating an output based on sensor data and camera data. The method 600 illustrates the effect of different graphics and/or different sensor data may have on the augmented reality output 150.

The method 600 may, in at least some embodiments, be performed at 406 of FIG. 4 or 5. The method 600 includes features which may be provided by an electronic device 201, such as the electronic device 201 of FIGS. 2 and/or 3. More particularly, one or more application or module associated with the electronic device 201, such as the augmented reality application 297 (FIG. 3), may contain processor readable instructions for causing a processor associated with the electronic device 201 to perform one or more steps of the method 600 of FIG. 6. That is, in at least some example embodiments, the electronic device 201 may be configured to perform the method 600 of FIG. 6.

In at least some embodiments, one or more of the functions or features of the method 600 of FIG. 6 may be performed, in whole or in part, by another system, software application, module, component or device apart from those specifically listed above.

At 602, the electronic device may attempt to identify a graphic represented in the camera data. That is, the electronic device 201 may attempt to determine whether the camera data includes a graphic 104 which is known to the electronic device 201. The identification of a graphic in the camera data may be performed, for example, by comparing the camera data to a graphic database 299. The graphic database 299 may be of the type described above with reference to FIG. 3. For example, the graphic database may define one or more graphics which are known to the electronic device 201.

In at least some embodiments, in order to identify the graphic, the electronic device 201 may determine, at 604, whether a graphic contained in the camera data corresponds to a first known graphic. For example, in at least some embodiments, at 604, the electronic device 201 determines whether the camera data includes a graphic which contains features associated with a first known graphic. The first known graphic is a specific one of the graphics in the graphic database 299. That is, at 604 the electronic device 201 determines whether a captured graphic corresponds to one of the graphics in the camera database.

If the electronic device 201 determines, at 604, that the camera data does not include a graphic corresponding to the first known graphic, then at 605 it may determine whether the camera data includes a graphic corresponding to a second known graphic. The second known graphic is another one of the graphics represented in the graphics database 299. That is, the second known graphic is not the same graphic as the first known graphic.

In at least some embodiments, at 602, the electronic device 201 may compare the camera data to all graphics in the graphic database to determine whether the camera data includes a graphic corresponding to any of the graphics in the graphic database. Accordingly, while the embodiment of FIG. 6 illustrates a method 600 in which the camera data is compared to only the first known graphic and the second known graphic, in other embodiments, the identification process (at 602) may compare the camera data to a greater number of known graphics.

As noted above, in at least some embodiments, an augmented reality output 150 (FIG. 2) may be generated based on both camera data (e.g. based on the graphic identified at 602) and also based on the sensor data from a sensor 255. Accordingly, in at least some embodiments, a graphic in the graphic database 299 (FIG. 3) may have one or more predetermined criteria associated with that graphic. The predetermined criteria may specify one or more sensor conditions and may associate such sensor conditions with a specific device-generated portion 120 for an augmented reality output 150. If such conditions are found to exist (i.e. if the sensor data satisfies the predetermined criteria), then the device-generated portion 120 associated with that sensor condition (and that graphic) may be selected and used to generate the augmented reality output 150 (FIG. 2).

For example, in the embodiment of FIG. 6, each of the two known graphics are associated with separate first predetermined criteria and second predetermined criteria. These criteria are separate in the sense that the first predetermined criteria associated with the first known graphic need not be the same as the first predetermined criteria associated with the second known graphic.

In the illustrated embodiment, if, at 604, the electronic device 201 determines that a graphic contained in the camera data corresponds to a first known graphic, then at 606, the electronic device may determine whether sensor data obtained from the sensor 255 (FIG. 3) satisfies first predetermined criteria related to the first known graphic. In at least some embodiments, the predetermined criteria may include a threshold. For example, in at least some embodiments, the predetermined criteria may require that the sensor data represent a number which is greater than a threshold. In other embodiments, the predetermined criteria may require that the sensor data represent a number which is less than the threshold. For example, in one embodiment, the predetermined criteria may require that the altitude of the electronic device be greater than a predetermined threshold. In other embodiments, the predetermined criteria may require that a location of the electronic device be within a certain distance from a fixed location. Other predetermined criteria may be used in other embodiments.

If, at 606, the electronic device determines that the sensor data from the sensor satisfies the first predetermined criteria associated with the first known graphic, then at 608, the electronic device may generate an output on the electronic device based on the specific device-generated portion 120 associated with that predetermined criteria and that known graphic. For example, in the illustrated embodiment, the electronic device may generate a first animation. The first animation is an animation which is associated with the sensor condition and with the graphic identified at 602. The first animation may form the device-generated portion 120 of the augmented reality output 150 (FIG. 2).

If, however, at 606, the electronic device determines that the sensor data from the sensor does not satisfy the first predetermined criteria associated with the first known graphic, then at 610, the electronic device 201 may determine whether second predetermined criteria associated with the first known graphic is satisfied. If so, then at 612, the electronic device may generate an output on the electronic device based on the specific device-generated portion 120 associated with that predetermined criteria and that known graphic. For example, in the illustrated embodiment, the electronic device may generate a second animation. The second animation is an animation which is associated with the sensor condition which was found to exist at 610 and with the graphic identified at 602. The second animation may form the device-generated portion 120 of the augmented reality output 150 (FIG. 2). The second animation is different than the first animation.

If, at 602, the electronic device 201 determines that the graphic included in the camera data corresponds to the second known graphic (which may be determined at 605), then the electronic device may evaluate the sensor data against one or more predetermined conditions associated with that known graphic. For example, in the embodiment of FIG. 6, at 616, the electronic device 201 determines whether the sensor data satisfies first predetermined criteria related to the second known graphic. That is, the electronic device 201 determines whether a sensor condition associated with the second known graphic exists. If so, then at 618 the electronic device may generate an output on the electronic device based on the specific device-generated portion 120 associated with that predetermined criteria and that known graphic. For example, in the illustrated embodiment, the electronic device may generate a third animation. The third animation is an animation which is associated with the sensor condition found to exist at 616 and with the graphic identified at 602. The third animation may form the device-generated portion 120 of the augmented reality output 150 (FIG. 2). In at least some embodiments, the third animation may be different than the first animation of 608 and the second animation of 612.

If, at 616, the electronic device 201 determines that the sensor data does not satisfy the first predetermined criteria associated with the second known graphic, then at 610, the electronic device 201 may determine, at 620, whether second predetermined criteria associated with the second known graphic is satisfied. If so, then at 622, the electronic device may generate an output on the electronic device based on the specific device-generated portion 120 associated with that predetermined criteria and that known graphic. For example, in the illustrated embodiment, the electronic device may generate a fourth animation. The fourth animation is an animation which is associated with the sensor condition which was found to exist at 620 and with the graphic identified at 602. The fourth animation may form the device-generated portion 120 of the augmented reality output 150 (FIG. 2). The second animation is different than the third animation and may be different from the first animation of 608 and the second animation of 612.

While the example embodiment of FIG. 6 illustrated an embodiment in which each known graphic was associated with two sensor conditions (i.e. two predetermined criteria), in other embodiments, one or more of the known graphics may be associated with a greater or lesser number of sensor conditions.

Method for Generating Augmented Reality Output Based on Location

In at least some embodiments, an augmented reality output 150 (FIG. 2) may depend on both the camera data and also on the location of the electronic device 201 (and/or the card 102). That is, the location of the electronic device 201 and/or the card 102 may affect the augmented reality output 150.

Figure 7:
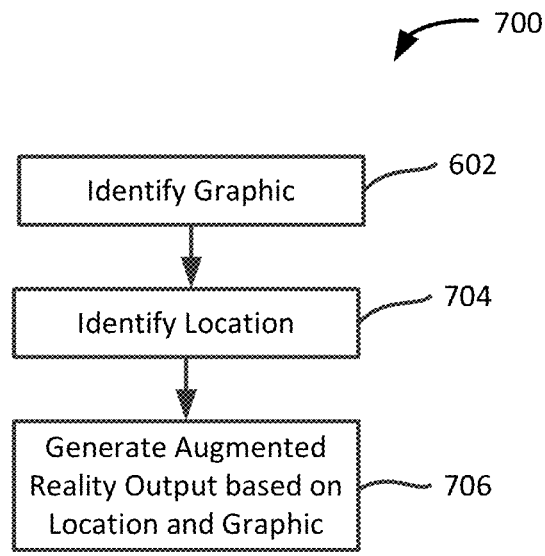
FIG. 7 is a flowchart of an example method for generating an output based on sensor data and camera data in accordance with example embodiments of the present disclosure.

Referring now to FIG. 7, an example of one such method 700 is illustrated. The method 700 may, in at least some embodiments, be performed at 406 of FIG. 4 or 5. The method 700 includes features which may be provided by an electronic device 201, such as the electronic device 201 of FIGS. 2 and/or 3. More particularly, one or more application or module associated with the electronic device 201, such as the augmented reality application 297 (FIG. 3), may contain processor readable instructions for causing a processor associated with the electronic device 201 to perform one or more steps of the method 700 of FIG. 7. That is, in at least some example embodiments, the electronic device 201 may be configured to perform the method 700 of FIG. 7.

In at least some embodiments, one or more of the functions or features of the method 700 of FIG. 7 may be performed, in whole or in part, by another system, software application, module, component or device apart from those specifically listed above.

In at least some embodiments, the method 700 may be performed by a geocaching application. That is, a geocaching application, which may reside in memory of the electronic device 201 may include processor readable instructions for causing a processor associated with the electronic device 201 to perform one or more steps of the method 700 of FIG. 7. Geocaching is a sporting activity in which a participant attempts to find containers (also called "geocaches" or "caches") which are hidden in the real world. In at least some embodiments, such containers may include a card 102 of the type described above with reference to FIG. 1. In such embodiments, the graphic 104 on the card 102 and the location of the card 102 could affect the augmented reality output 150 of the electronic device 201.

First, at 602, the electronic device 201 may attempt to identify a graphic in the camera data. This may be done in the manner described above with reference to FIG. 6.

Next, at 704, the electronic device identifies the location of the electronic device 201 from the sensor data obtained from the sensor 255. For example, in at least some embodiments, the sensor is a location sensor which generates sensor data based on the location of the electronic device 201.

Next, at 706, the electronic device generates the augmented reality output on the output interface of the electronic device 201 based on the location of the electronic device 201 and also based on the graphic identified at 602. The output may be generated in the manner described above with reference to 406 of FIG. 4. For example, the output may be generated on the display 204 of the electronic device 201.

Method for Generating Augmented Reality Output Based on Direction

In at least some embodiments, an augmented reality output 150 (FIG. 2) may depend on both the camera data and also on the direction of the electronic device 201 (e.g. relative to magnetic north) and/or the card 102. That is, the direction of the electronic device 201 and/or the card 102 may affect the augmented reality output 150.

Figure 8:
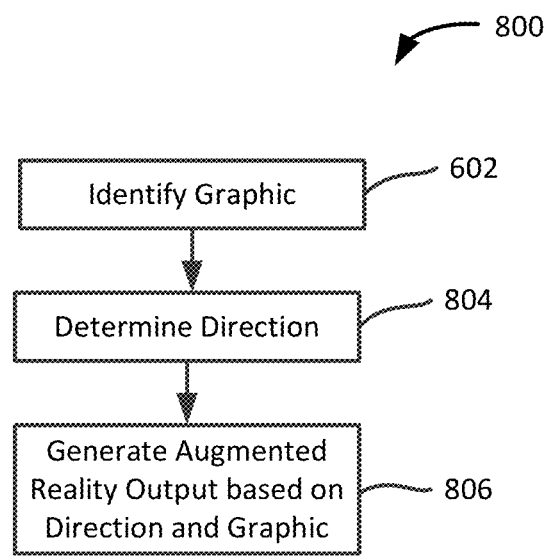
FIG. 8 is a flowchart of an example method for generating an output based on sensor data and camera data in accordance with example embodiments of the present disclosure.

Referring now to FIG. 8, an example of one such method 800 is illustrated. The method 800 may, in at least some embodiments, be performed at 406 of FIG. 4 or 5. The method 800 includes features which may be provided by an electronic device 201, such as the electronic device 201 of FIGS. 2 and/or 3. More particularly, one or more application or module associated with the electronic device 201, such as the augmented reality application 297 (FIG. 3), may contain processor readable instructions for causing a processor associated with the electronic device 201 to perform one or more steps of the method 800 of FIG. 8. That is, in at least some example embodiments, the electronic device 201 may be configured to perform the method 800 of FIG. 8.

In at least some embodiments, one or more of the functions or features of the method 800 of FIG. 8 may be performed, in whole or in part, by another system, software application, module, component or device apart from those specifically listed above.

First, at 602, the electronic device 201 may attempt to identify a graphic in the camera data. This may be done in the manner described above with reference to FIG. 6.

Next, at 804, the electronic device identifies the direction of the electronic device 201 and or the card based on the sensor data. In at least some such embodiments, the sensor 255 may be an electronic compass which generates sensor data which specifies direction information. The direction information may, for example, specify the direction of magnetic north relative to the electronic device 201. In at least some embodiments, the electronic compass is a magnetometer.

In at least some embodiments, at 804 the electronic device 201 uses the direction information from the sensor 255 and the orientation of the graphic in the camera data to determine the orientation of the card. That is, the orientation of the card relative to the electronic device (which may be determined by analyzing the camera data) and the orientation of the camera relative to magnetic north (which may be determined from the sensor data) may be used to determine the orientation of the card 102 relative to magnetic north. That is, an absolute orientation of the card 102 may be determined.

Next, at 806, the electronic device generates the augmented reality output on the output interface of the electronic device 201 based on the direction of the electronic device 201 and/or the card 102 and also based on the graphic identified at 602. The output may be generated in the manner described above with reference to 406 of FIG. 4. For example, the output may be generated on the display 204 of the electronic device 201.

Thus, the augmented reality output may be affected by the direction of the card 102 and/or the electronic device 201.

Method for Generating Augmented Reality Output Based on Velocity

In at least some embodiments, an augmented reality output 150 (FIG. 2) may depend on both the camera data and also on the velocity of movement of the electronic device 201. That is, the velocity at which the electronic device 201 is moving may affect the augmented reality output 150. For example, in at least some embodiments, a different augmented reality output 150 will be generated when the electronic device 201 is moving than will be generated when the electronic device 201 is stationary.

Figure 9:
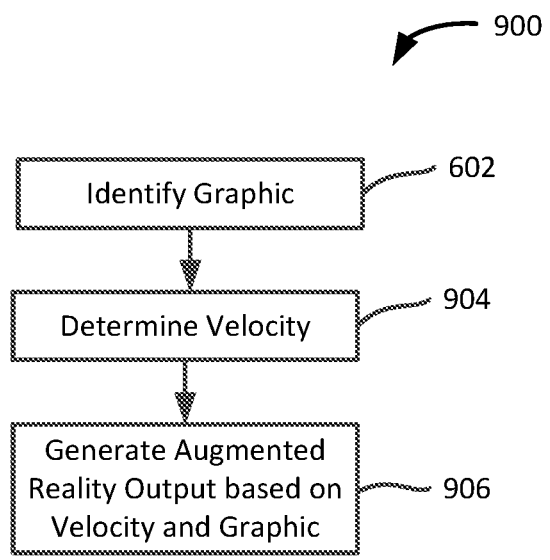
FIG. 9 is a flowchart of an example method for generating an output based on sensor data and camera data in accordance with example embodiments of the present disclosure.

Referring now to FIG. 9, an example of one such method 900 is illustrated. The method 900 may, in at least some embodiments, be performed at 406 of FIG. 4 or 5. The method 900 includes features which may be provided by an electronic device 201, such as the electronic device 201 of FIGS. 2 and/or 3. More particularly, one or more application or module associated with the electronic device 201, such as the augmented reality application 297 (FIG. 3), may contain processor readable instructions for causing a processor associated with the electronic device 201 to perform one or more steps of the method 900 of FIG. 9. That is, in at least some example embodiments, the electronic device 201 may be configured to perform the method 900 of FIG. 9.

In at least some embodiments, one or more of the functions or features of the method 900 of FIG. 9 may be performed, in whole or in part, by another system, software application, module, component or device apart from those specifically listed above.

First, at 602, the electronic device 201 may attempt to identify a graphic in the camera data. This may be done in the manner described above with reference to FIG. 6.

Next, at 904, the electronic device identifies a velocity associated with the electronic device 201 based on the sensor data. That is, the electronic device determines a rate of movement of the electronic device. In at least some embodiments, the sensor is a location sensor which generates sensor data based on the location of the electronic device 201. In some such embodiments, the electronic device may determine its velocity based on the rate at which the location of the electronic device 201 changes. That is, the electronic device may evaluate its change of distance and the time associated with that change of distance in order to determine its velocity. Other methods of determining velocity based on the sensor data may be used in other embodiments.

Next, at 906, the electronic device generates the augmented reality output on the output interface of the electronic device 201 based on the velocity of the electronic device 201 and also based on the graphic identified at 602. The output may be generated in the manner described above with reference to 406 of FIG. 4. For example, the output may be generated on the display 204 of the electronic device 201.

Thus, the augmented reality output may be affected by the velocity of the electronic device 201.

Method for Generating Augmented Reality Output Based on Orientation

In at least some embodiments, an augmented reality output 150 (FIG. 2) may depend on both the camera data and also on the orientation of the electronic device 201. For example, in at least some embodiments, a different augmented reality output 150 will be generated when the electronic device 201 is oriented such that its camera is directed upward than will be generated when the electronic device 201 is oriented such that the camera points downward.

Figure 10:
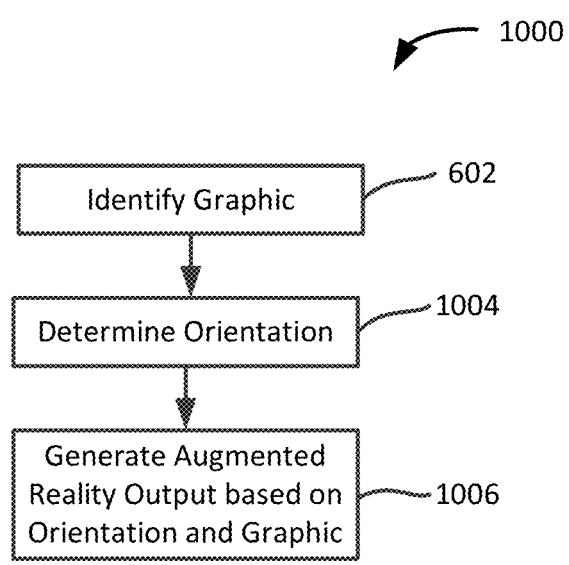
FIG. 10 is a flowchart of an example method for generating an output based on sensor data and camera data in accordance with example embodiments of the present disclosure.

Referring now to FIG. 10, an example of one such method 1000 is illustrated. The method 1000 may, in at least some embodiments, be performed at 406 of FIG. 4 or 5. The method 1000 includes features which may be provided by an electronic device 201, such as the electronic device 201 of FIGS. 2 and/or 3. More particularly, one or more application or module associated with the electronic device 201, such as the augmented reality application 297 (FIG. 3), may contain processor readable instructions for causing a processor associated with the electronic device 201 to perform one or more steps of the method 1000 of FIG. 10. That is, in at least some example embodiments, the electronic device 201 may be configured to perform the method 1000 of FIG. 10.

In at least some embodiments, one or more of the functions or features of the method 1000 of FIG. 10 may be performed, in whole or in part, by another system, software application, module, component or device apart from those specifically listed above.

First, at 602, the electronic device 201 may attempt to identify a graphic in the camera data. This may be done in the manner described above with reference to FIG. 6.

Next, at 1004, the electronic device determines an orientation of the electronic device 201 based on sensor data received from a sensor 255 (which may be an orientation sensor such as an accelerometer). For example, the electronic device 201 may determine whether the electronic device 201 is oriented so that a camera associated with that electronic device is directed upwardly and/or whether the electronic device 201 is oriented so that a camera associated with that electronic device is directed downwardly. That is, the electronic device 201 effectively determines whether the card 102 is above or below the electronic device 201.

Next, at 1006, the electronic device generates the augmented reality output on the output interface of the electronic device 201 based on the orientation of the electronic device 201 and also based on the graphic identified at 602. The output may be generated in the manner described above with reference to 406 of FIG. 4. For example, the output may be generated on the display 204 of the electronic device 201. In at least some embodiments, if the electronic device 201 determines (at 1004) that the electronic device is oriented so that the camera is pointed upwardly (i.e. if the electronic device determines that the card is above the electronic device) then the augmented reality output 150 may have a first effect. For example, in at least some embodiments, the device-generated portion 120 of the augmented reality output 150 may appear to be hanging from the real-world portion 122.

In at least some embodiments, if the electronic device 201 determines (at 1004) that the electronic device is orientated so that the camera is pointed downwardly (i.e. if the electronic device determines that the card is below the electronic device) then the augmented reality output 150 may have a second effect (which may be different than the first effect). For example, in at least some embodiments, the device-generated portion 120 of the augmented reality output may appear to be standing on the real-world portion 122.

Method for Generating Augmented Reality Output Based on Altitude

In at least some embodiments, an augmented reality output 150 (FIG. 2) may depend on both the camera data and also on the altitude of the electronic device 201. That is, altitude of the electronic device 201 may affect the augmented reality output 150. For example, in at least some embodiments, a different augmented reality output 150 will be generated when the electronic device 201 is above a certain threshold than will be generated when the electronic device is below a certain threshold.

Figure 11:
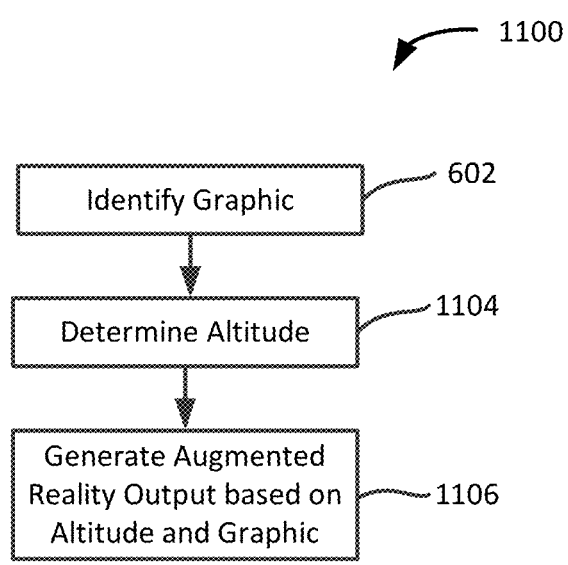
FIG. 11 is a flowchart of an example method for generating an output based on sensor data and camera data in accordance with example embodiments of the present disclosure.

Referring now to FIG. 11, an example of one such method 1100 is illustrated. The method 1100 may, in at least some embodiments, be performed at 406 of FIG. 4 or 5. The method 1100 includes features which may be provided by an electronic device 201, such as the electronic device 201 of FIGS. 2 and/or 3. More particularly, one or more application or module associated with the electronic device 201, such as the augmented reality application 297 (FIG. 3), may contain processor readable instructions for causing a processor associated with the electronic device 201 to perform one or more steps of the method 1100 of FIG. 11. That is, in at least some example embodiments, the electronic device 201 may be configured to perform the method 1100 of FIG. 11.

In at least some embodiments, one or more of the functions or features of the method 1100 of FIG. 11 may be performed, in whole or in part, by another system, software application, module, component or device apart from those specifically listed above.

First, at 602, the electronic device 201 may attempt to identify a graphic in the camera data. This may be done in the manner described above with reference to FIG. 6.

Next, at 1104, the electronic device identifies an altitude associated with the electronic device 201 from sensor data received from a sensor 255 of the electronic device. In some embodiments, the sensor is an altimeter. The altimeter generates sensor data which specifies an altitude associated with the electronic device. The altimeter may, for example, be provided by the location sensor. For example, the altimeter may determine altitude by four-way trilateration. For example, where the location sensor is a GPS sensor, altitude of the electronic device 201 may be determined by trilateration with four or more satellites.

Next, at 1106, the electronic device generates the augmented reality output on the output interface of the electronic device 201 based on the altitude of the electronic device 201 and also based on the graphic identified at 602. The output may be generated in the manner described above with reference to 406 of FIG. 4. For example, the output may be generated on the display 204 of the electronic device 201. In at least some embodiments, the augmented reality output 150 may be generated by comparing the altitude of the electronic device to a predetermined threshold. A different augmented reality output may be generated if the altitude of the electronic device exceeds the threshold than will be generated if the altitude of the electronic device does not exceed the threshold. For example, in some embodiments, when the sensor data indicates that the altitude is greater than a predetermined threshold, a high-altitude effect may be applied to the augmented reality output. For example, a graphic in the augmented reality output may appear to be on a mountain or in an airplane. By way of example, the person graphic 104 of FIG. 2 may be shown to climb a mountain or board an airplane. In some embodiment, when the sensor data indicates that the altitude is less than the threshold, a low-altitude effect may be applied to the augmented reality output. For example, a graphic in the augmented reality output may appear to be at ground level.

While the embodiments described herein discussed the use of a card 102 to provide an augmented reality experience on an electronic device 201, in other embodiments, the methods and devices described below may be used with an object of another type. For example, in some embodiments, a game piece may be used to provide an augmented reality experience on an electronic device 201 (FIGS. 2 and 3). The game piece may be an object of the type commonly used with board games. The game piece may, in some embodiments, be constructed of plastic, metal, and/or wood.

While the present application is primarily described in terms of methods, a person of ordinary skill in the art will understand that the present application is also directed to various apparatus such as a handheld electronic device and a server. The handheld electronic device and the server includes components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD)

or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method, implemented by a processor of an electronic device, the method comprising:
    obtaining camera data from a camera associated with the electronic device, the camera data defining an image having a graphic disposed thereon;
    obtaining non-image sensor data from a sensor associated with the electronic device, wherein the sensor is distinct from the camera; and
    determining if the graphic corresponds to a first known graphic and, if so:
        selecting, from two or more graphics associated with the first known graphic in a graphics database, a second graphic, the two or more graphics having different corresponding sensor conditions, wherein the selecting comprises:
            comparing the obtained sensor data with the respective sensor conditions of the two or more graphics associated with the first known graphic to determine that the sensor data satisfies sensor conditions associated with a first one of the two or more graphics, wherein the sensor condition associated with each of the two or more graphics defines a threshold value to which the sensor data is compared; and
            selecting, as the second graphic, the first one of the two or more graphics; and
        generating an augmented reality output including a device-generated portion that includes the second graphic.

2. The method of claim 1, wherein the device-generated portion is generated by the electronic device and is superimposed on the image defined by the camera data.

3. The method of claim 2, wherein the device-generated portion is generated based on the graphic and based on the sensor data.

4. The method of claim 1, wherein generating the augmented reality output comprises: identifying the graphic.

5. The method of claim 1, wherein the sensor data indicates a location of the electronic device.

6. The method of claim 1, wherein the sensor is an electronic compass, and wherein the sensor data specifies direction information.

7. The method of claim 6, further comprising:
    determining a direction associated with the graphic based on the direction information, wherein generating the augmented reality output comprises:
        generating the augmented reality output based on the direction associated with the graphic and based on the graphic.

8. The method of claim 1, wherein the sensor is an altimeter and wherein the sensor data specifies an altitude associated with the electronic device.

9. The method of claim 1, wherein the sensor data specifies a physical property associated with the electronic device or its operating environment.

10. The method of claim 1, further comprising:
    determining a velocity associated with the electronic device based on the sensor data, wherein generating the augmented reality output comprises:
        generating the augmented reality output based on the velocity associated with the electronic device and the graphic.

11. The method of claim 1, wherein the sensor is an orientation sensor and wherein generating the augmented reality output comprises:
    determining, from the sensor data, whether the graphic is located above the electronic device or whether the graphic is located below the electronic device; and
    generating the augmented reality output based on the result of the determination of whether the graphic is located above the electronic device or whether the graphic is located below the electronic device.

12. An electronic device comprising:
    a camera;
    an output interface;
    a sensor distinct from the camera; and
    a processor connected to the camera, the sensor, and the output interface, wherein the processor is configured to:
        obtain camera data from the camera, the camera data defining an image having a graphic disposed thereon;
        obtain non-image sensor data from the sensor; and
        determine if the graphic corresponds to a first known graphic and, if so:
            select, from two or more graphics associated with the first known graphic in a graphics database, a second graphic, the two or more graphics having different corresponding sensor conditions, wherein the selecting comprises:
                comparing the obtained sensor data with the respective sensor conditions of the two or more graphics associated with the first known graphic to determine that the sensor data satisfies sensor conditions associated with a first one of the two or more graphics, wherein the sensor condition associated with each of the two or more graphics defines a threshold value to which the sensor data is compared; and
                selecting, as the second graphic, the first one of the two or more graphics; and
            generate an augmented reality output including a device-generated portion that includes the second graphic.

13. The electronic device of claim 12, wherein the augmented reality output is generated by the electronic device and is superimposed on the image defined by the camera data.

14. The electronic device of claim 13, wherein the device-generated portion is generated based on the graphic and based on the sensor data.

15. The electronic device of claim 12, wherein generating the augmented reality output comprises identifying the graphic.

16. The electronic device of claim 12, wherein the sensor data indicates a location of the electronic device.

17. The electronic device of claim 12, wherein the sensor is an electronic compass, and wherein the sensor data specifies direction information.

18. A non-transitory computer readable storage medium comprising computer readable instructions for:
 obtaining camera data from a camera associated with an electronic device, the camera data defining an image having a graphic disposed thereon;
 obtaining non-image sensor data from a sensor associated with the electronic device, wherein the sensor is distinct from the camera; and
 determining if the graphic corresponds to a first known graphic and, if so:
  selecting, from two or more graphics associated with the first known graphic in a graphics database, a second graphic, the two or more graphics having different corresponding sensor conditions, wherein the selecting comprises:
   comparing the obtained sensor data with the respective sensor conditions of the two or more graphics associated with the first known graphic to determine that the sensor data satisfies sensor conditions associated with a first one of the two or more graphics, wherein the sensor condition associated with each of the two or more graphics defines a threshold value to which the sensor data is compared; and
   selecting, as the second graphic, the first one of the two or more graphics; and
  generating an augmented reality output including a device-generated portion that includes the second graphic.

\* \* \* \* \*